US010763024B2

(12) United States Patent
Shijo et al.

(10) Patent No.: US 10,763,024 B2
(45) Date of Patent: Sep. 1, 2020

(54) POWER TRANSMISSION APPARATUS

(71) Applicant: KABUSHIKI KAISHA TOSHIBA, Tokyo (JP)

(72) Inventors: Tetsu Shijo, Tokyo (JP); Makio Fukumoto, Chiba (JP); Fumi Moritsuka, Kanagawa (JP); Shuichi Obayashi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 20 days.

(21) Appl. No.: 15/703,482

(22) Filed: Sep. 13, 2017

(65) Prior Publication Data

US 2018/0096773 A1    Apr. 5, 2018

(30) Foreign Application Priority Data

Oct. 3, 2016   (JP) .................................. 2016-195884

(51) Int. Cl.
| | | |
|---|---|---|
| *H01F 27/02* | (2006.01) | |
| *H02J 7/00* | (2006.01) | |
| *H02J 5/00* | (2016.01) | |
| *H02J 50/10* | (2016.01) | |
| *B60L 53/12* | (2019.01) | |
| *H01F 38/14* | (2006.01) | |

(52) U.S. Cl.
CPC ............ *H01F 27/022* (2013.01); *B60L 53/12* (2019.02); *H01F 38/14* (2013.01); *H02J 5/005* (2013.01); *H02J 7/0042* (2013.01); *H02J 50/10* (2016.02); *Y02T 10/7005* (2013.01); *Y02T 10/7072* (2013.01); *Y02T 90/122* (2013.01); *Y02T 90/14* (2013.01)

(58) Field of Classification Search
CPC ............. H01F 27/02; H01F 38/14; H02J 7/00
See application file for complete search history.

(56) References Cited

U.S. PATENT DOCUMENTS

| | | | |
|---|---|---|---|
| 9,184,633 B2 | 11/2015 | Obayashi et al. | |
| 9,595,378 B2* | 3/2017 | Jonas | |
| 9,745,703 B2 | 8/2017 | Curran et al. | |
| 2012/0105252 A1* | 5/2012 | Wang | ..................... G08G 1/017 340/936 |
| 2014/0175892 A1* | 6/2014 | Jonas | ..................... H01F 27/006 307/104 |

(Continued)

FOREIGN PATENT DOCUMENTS

| | | | |
|---|---|---|---|
| JP | 2012-165498 A | 8/2012 | |
| JP | 2013-192450 A | 9/2013 | |

(Continued)

*Primary Examiner* — Jared Fureman
*Assistant Examiner* — Emmanuel Dominique
(74) *Attorney, Agent, or Firm* — Finnegan, Henderson, Farabow, Garrett & Dunner, L.L.P.

(57) ABSTRACT

A power transmission apparatus includes a power transmission pad, a base structure, and grout. The power transmission pad for wireless power transmission has a cast resin frame, at least part of the cast resin frame being embedded in the ground. The base structure is disposed below the power transmission pad. The grout is filled around the power transmission pad, including a gap between an upper surface of the base structure and the power transmission pad.

12 Claims, 3 Drawing Sheets

(56) References Cited

U.S. PATENT DOCUMENTS

| | | | |
|---|---|---|---|
| 2014/0240146 A1* | 8/2014 | Neel | G08G 1/0133 |
| | | | 340/933 |
| 2014/0255106 A1* | 9/2014 | Henderson | E02D 5/34 |
| | | | 405/256 |
| 2016/0043571 A1* | 2/2016 | Kesler | H02J 50/70 |
| | | | 307/104 |
| 2016/0229294 A1 | 8/2016 | Abe et al. | |
| 2016/0308391 A1* | 10/2016 | Easton | B60L 53/30 |
| 2017/0004916 A1 | 1/2017 | Shijo et al. | |
| 2017/0288469 A1* | 10/2017 | Murashige | B60L 53/124 |
| 2018/0005747 A1 | 1/2018 | Shijo et al. | |

FOREIGN PATENT DOCUMENTS

| | | |
|---|---|---|
| JP | 2013209442 A  * | 10/2013 |
| JP | 5562797 | 7/2014 |
| JP | 2015-536124 A | 12/2015 |
| WO | WO 2014-147860 | 9/2014 |
| WO | WO 2015-189977 A1 | 12/2015 |
| WO | WO 2016-135949 A1 | 9/2016 |
| WO | WO 2016/143341 A1 | 9/2016 |
| WO | WO 2017-029713 | 2/2017 |

* cited by examiner

POWER TRANSMISSION APPARATUS

CROSS REFERENCE TO RELATED APPLICATIONS

This application is based upon and claims the benefit of priority from the prior Japanese Patent Application No. 2016-195884, flied on Oct. 3, 2016, the entire contents of which are incorporated herein by reference.

FIELD

An embodiment relates to a power transmission apparatus.

BACKGROUND

Along with the spread of electric vehicles (EVs) and hybrid electric vehicles (HEVs), it is considered to install a power transmission pad for wireless charging to the EVs and HEVs in a charging station and like. The power transmission pad is covered with a protector such as cement and then embedded in the ground. Since a high voltage is applied to the power transmission pad, the protector is required to have excellent insulation performance. However, if the protector is formed with cement or the like, cracks occur due to aging degradation, and hence desired insulation performance may not be obtained. If the insulation performance is degraded, it is required to remove the protector and embed the power transmission pad again, which takes a high maintenance cost.

DETAILED DESCRIPTION

A power transmission apparatus according to the present embodiment is provided with a power transmission pad, a base structure, and grout. The power transmission pad for wireless power transmission has a cast resin frame, at least part of the cast resin frame being embedded in the ground. The base structure is disposed below the power transmission pad. The grout is filled around the power transmission pad, including a gap between an upper surface of the base structure and the power transmission pad.

An embodiment will now be explained with reference to the accompanying drawings. Hereinbelow, an explanation will be made for a power transmission apparatus to be used for wireless charging to EVs and HEVs. The power transmission apparatus according to the present embodiment is embedded in the ground of a charging station and the like. A vehicle is stopped just above a charging apparatus and charged with power without a charging cable.

Figure 1:
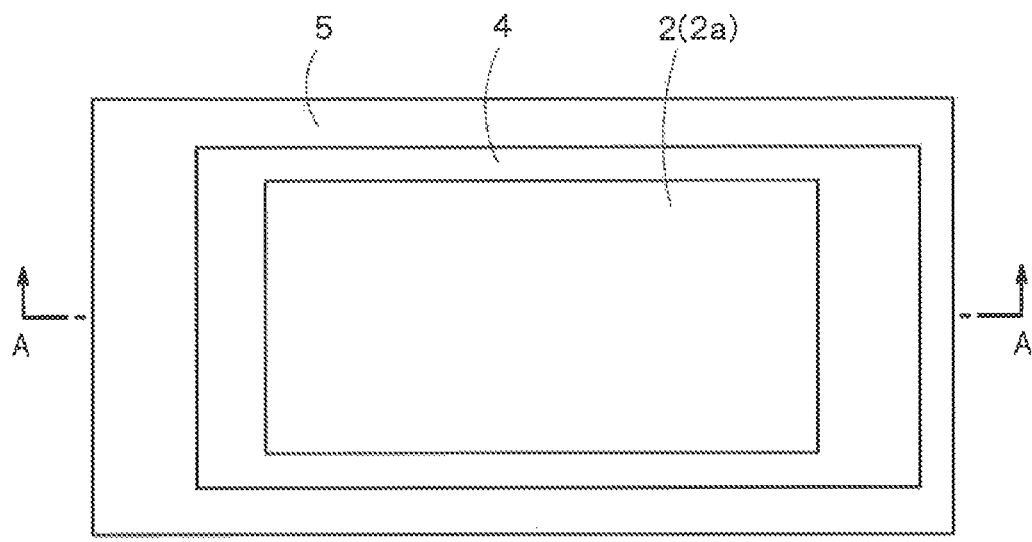
FIG. 1 is a top view of a power transmission apparatus 1 according to an embodiment.
Figure 2:
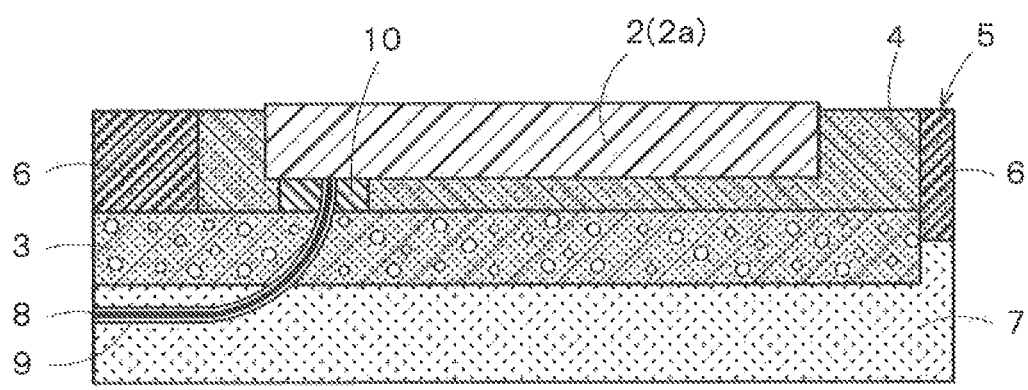
FIG. 2 is a sectional view taken on line A-A of FIG. 1.

FIG. 1 is a top view of a power transmission apparatus 1 according to an embodiment, FIG. 2 is a sectional view taken on line A-A of FIG. 1. The power transmission apparatus 1 according to the present embodiment has a power transmission pad 2, a base structure 3, and grout 4.

The power transmission pad 2 is accommodated in, for example, a rectangular cast resin frame 2a. At least part of the cast resin frame 2a is embedded in the ground. It is more desirable that an upper surface of the cast resin frame 2a is flush with or protrudes above a ground surface 5. This is because, if the upper surface of the cast resin frame 2a is positioned lower than the ground surface 5, foreign matter, such as water and dust, may accumulate on the upper surface of the cast resin frame 2a. To the contrary, if the upper surface of the cast resin frame 2a protrudes above the ground surface 5 too much, it obstructs the passage of vehicles, human beings, etc. It is therefore desirable that the cast resin frame 2a is disposed so that the upper surface of the cast resin frame 2a is positioned higher than the ground surface 5 by zero to several millimeters.

When the upper surface of the cast resin frame 2a is lower than the ground surface 5, it is considered that mortar, concrete, grout, asphalt, etc, are put on the upper surface to raise the upper surface. However, the mortar or the like is relatively easily peeled off unless it has a certain thickness (for example, 50 mm) or more. Moreover, from the point of view of wireless charging, it is desirable that the cast resin frame 2a is as close to a vehicle as possible. For this reason, the cast resin frame 2a is disposed so that its upper surface protrudes above the ground surface 5 a little bit and is exposed above the ground surface 5 without being covered with mortar or the like.

The cast resin frame 2a is formed in such a manner that thermosetting resin is filled or injected into a mold frame and is hardened after component parts of the power transmission pad 2 are installed in the mold frame. As the thermosetting resin, by selecting a material excellent in insulation, the insulation performance of the power transmission pad 2 can be improved. Since, a high voltage of about 600 volts is applied to a coil in the power transmission pad 2, it is the must to enhance the insulation performance for safety. For example, if the coil and the like of the power transmission pad 2 are solidified not with resin but with cement, the cement may get cracked to lower the insulation performance. In the present embodiment, since the cast resin frame 2a having the coil and the like solidified with the resin is provided, cracks do not occur and hence the insulation performance is not lowered.

Moreover, since the cast resin frame 2a can be formed in advance, it is not required at an installation site of the power transmission apparatus 1 to protect the coil and the like of the power transmission pad 2 with cement or the like, and hence an installation process of the power transmission apparatus 1 can be simplified.

The cast resin frame 2a is disposed on the base structure 3 which is disposed on sand, gravel, sediment, etc. 7 of the ground surface 5. Although the base structure 3 can have any area, as shown in FIG. 1, it is at least required to dispose the base structure 3 within a range that includes an installation area of the cast resin frame 2a.

The base structure 3 is made of concrete, for example. As the concrete is often used as a base material of structures, the concrete is an appropriate material from the point of view of forming a stable basis of the power transmission apparatus 1. Since the base structure 3 is not deformed even if a load is applied from above, by disposing the cast resin frame 2a of the power transmission pad 2 on the base structure 3, the power transmission pad 2 can be exposed. In other words, by providing the base structure 3, the location of the bottom of the power transmission pad 2 can be easily defined.

The concrete is a hardened material of sand, gravel, water, etc. solidified with cement, and may thus get cracked like cement. However, in the present embodiment, the base structure 3 is used to expose the power transmission pad 2, and, even if cracks occur, the power transmission pad 2 is not displaced in the vertical direction, with no relation to the insulation performance of the power transmission pad 2.

The grout 4 is filled around the cast resin frame 2a, including a gap between the base structure 3 and the cast resin frame 2a of the power transmission pad 2. The grout 4 is a liquid having fluidity and thus can be filled into a very narrow gap. By mixing the grout 4 with a hardener, it is also possible to harden the grout 4. Since the grout 4 is disposed on the concrete, the grout 4 is not be absorbed by the sand, gravel, sediment, etc. 7 under the concrete.

Asphalt (soil-invasion restriction member) 6 may be laid around the grout 4. By laying down the asphalt 6, the grout 4 can be prevented from flowing into the surrounding gravel and the like. When laying down the asphalt 6, it is required to put the asphalt 6 in a high-temperature and high-pressure condition. Because of this, when the cast resin frame 2a of the power transmission pad 2 is made in direct contact with the asphalt 6, the resin of the cast resin frame 2a may be softened to be deformed or the electric parts such as the coil in the cast resin frame 2a may be destroyed due to heat, pressure, etc. By filling the grout 4 between the asphalt 6 and the cast resin frame 2a of the power transmission pad 2, heat, pressure, etc. of the asphalt 6 are not directly transmitted to the power transmission pad 2, and hence the power transmission pad 2 can be prevented from being damaged.

By using grout 4 having an expansion rate of 0% or higher, the grout 4 does not contract when it is hardened, so that the power transmission pad 2 and the grout 4 can be prevented from having a gap therebetween.

A cable 8 is extending from the power transmission pad 2. The cable 8 is used for supplying a high voltage to the coil in the power transmission pad 2. The cable 8 is required to be prevented from disconnection and electric leakage, and to be secured with insulation.

Moreover, it is desirable that the cable 8 is laid down under or on the ground in the state where the cable 8 is inserted into a protective tube 9. The material of the protective tube 9 may be resin or metal. The resin does not rust, and the metal is hardly deformed and is shock-resistant, so that the cable 8 inside the protective tube 9 is hardly disconnected. The opening of the power transmission pad 2, from which the cable 8 is pulled out, is filled with an insulator 10 such as clay. This is for the purpose of preventing the grout 4 from entering into the protective tube 9 from the opening from which the cable 8 is pulled out.

Figure 3:
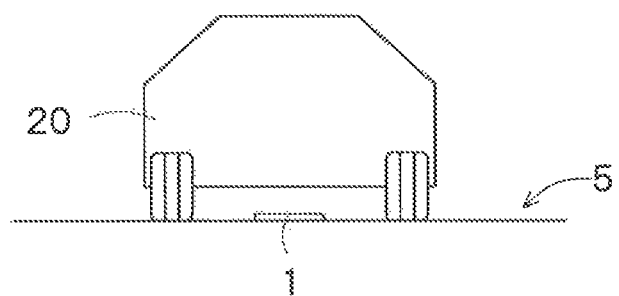
FIG. 3 is an illustration showing how to use the power transmission apparatus 1 of the present embodiment.

FIG. 3 is an illustration showing how to use the power transmission apparatus 1 of the present embodiment. An upper surface of the power transmission apparatus 1 protrudes a little bit higher than the ground surface 5 and is exposed above the ground surface 5. As required, the exposed upper surface of the power transmission pad 2 is painted with a striking color or marked with a sign so that a driver of a vehicle 20 can easily locate the place of the power transmission pad 2. The power transmission pad 2 in the power transmission apparatus 1 is, as described above, formed with the cast resin frame 2a, so that its upper surface may be slippery depending the resin material to be used or the process method. Fine concavities and convexities may be formed on the exposed upper surface of the power transmission pad 2 so that the upper surface is not slippery.

Such concavities and convexities may be formed, in advance, on a mold frame into which the thermosetting resin is filled. Or a surface treatment may be performed to form concavities and convexities on the upper surface after hardening the thermosetting resin.

Figure 4:
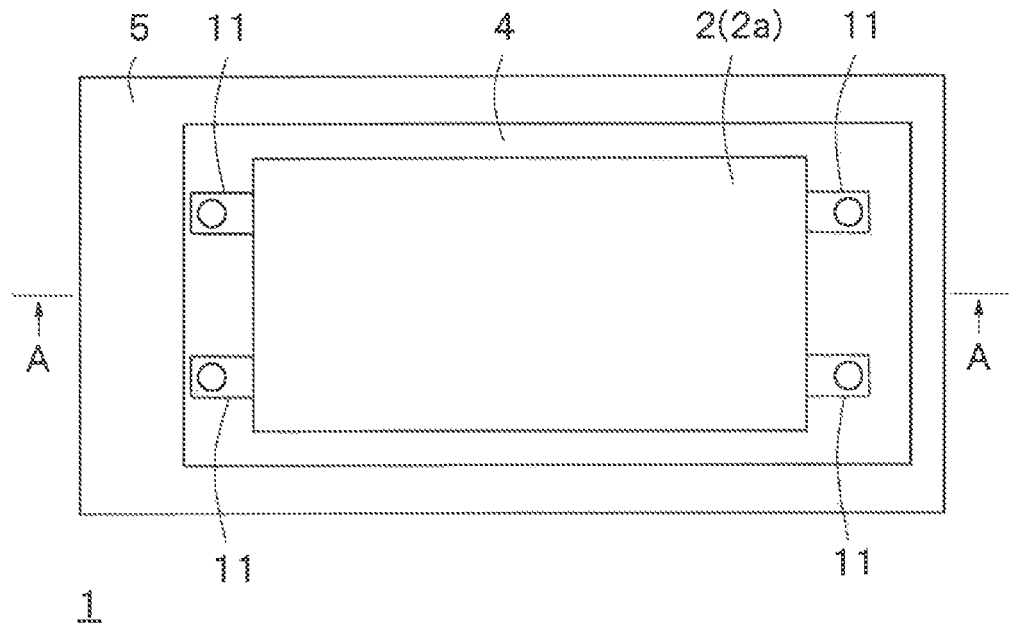
FIG. 4 is a top view of a modification of the power transmission apparatus 1 of FIG. 1.
Figure 5:
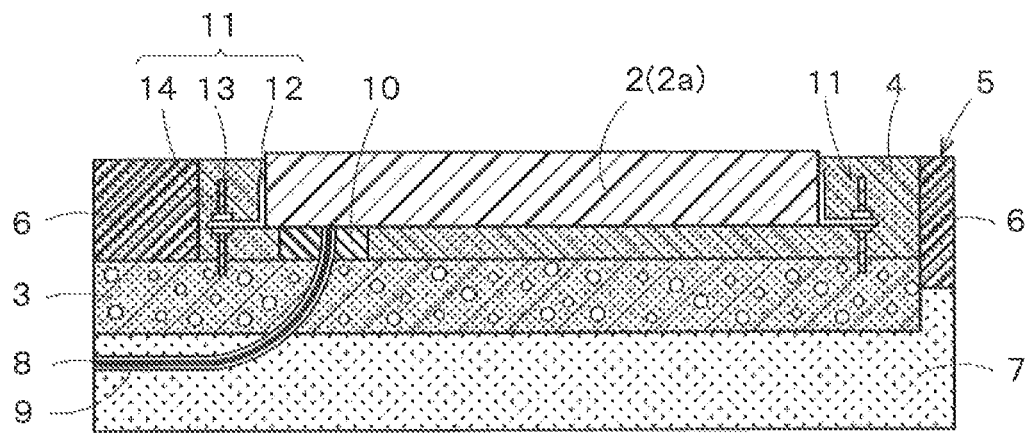
FIG. 5 is a sectional view taken on line A-A of FIG. 4.

FIG. 4 is a top view of a modification of the power transmission apparatus 1 of FIG. 1. FIG. 5 is a sectional view taken on line A-A of FIG. 4. In FIGS. 4 and 5, the elements identical with those of FIGS. 1 and 2, respectively, are given the same reference signs, with explanations mainly on different points hereinafter. The power transmission apparatus 1 of FIGS. 4 and 5 is provided with anchors 11 for fixing the power transmission pad 2 to the base structure 3. As shown in FIG. 4, the anchors 11 are disposed at four corners of the cast resin frame 2a of the power transmission pad 2. Each anchor 11 is provided with metal fittings 12, a bolt 13, and a nut 14. In fixing each anchor 11, the bolt 13 is inserted into a hole of the metal fittings 12 attached to a side face of the cast resin frame 2a, a head of the bolt 13 is embedded in the base structure 3 and fixed therein, and the bolt 13 is fixed to the metal fittings 12 with the nut 14.

By adjusting the depth at which the bolt 13 is embedded in the base structure 3, the position of the power transmission pad 2 in the vertical direction can be adjusted. In order to perform positional adjustments to the power transmission pad 2 in the vertical direction without using the anchors 11, it is required to adjust the depth of the base structure 3, or to adjust the injection amount of the grout 4. This causes a troublesome positional adjustment operation. To the contrary, when the anchors 11 are used, it is relatively easy to adjust the position of the power transmission pad 2 in the vertical direction.

Figure 6:
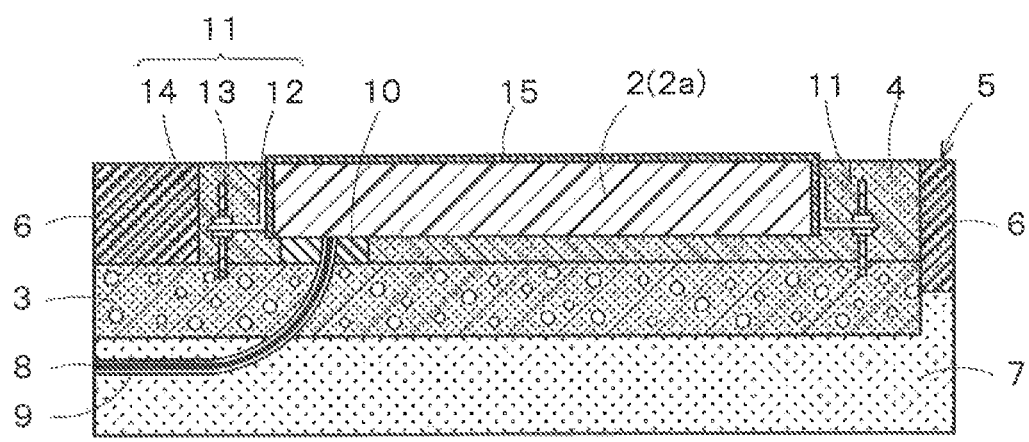
FIG. 6 is a sectional view of a modification of the power transmission apparatus 1 of FIG. 5, taken on line A-A of FIG. 4.

FIG. 6 is a sectional view of a modification of the power transmission apparatus 1 of FIG. 5, taken on line A-A of FIG. 4. FIG. 6 shows that the upper surface side of the cast resin frame 2a is covered with fiber-reinforced resin (FRP: fiber-reinforced plastics) 15. By covering the upper surface side of the cast resin frame 2a with the fiber-reinforced rein 15, impact resistance of the power transmission pad 2 is improved. Since the upper surface of the power transmission apparatus 1 protrudes a little bit from the ground surface 5 and is exposed above the ground surface 5, it tends to receive impact or load. By providing the fiber-reinforced rein 15, transmission of impact to the electric parts such as the coil in the power transmission pad 2 can be prevented and load bearing is improved. Since the fiber-reinforced resin 15 is an insulator, it does not prevent the flow of magnetic flux from the fiber-reinforced resin 15. Glass fiber, glass cloth, carbon fiber, etc. may be used as the fiber to be used as the fiber-reinforced resin 15.

The cast resin frame 2a of FIG. 5 itself can be formed with fiber-reinforced rein in such a manner that glass cloth is placed on a mold frame after the electric parts such as the coil are installed in the mold frame, and thermosetting resin is filled into the mold frame and hardened. For example, epoxy resin, polyester resin, etc. are used as the thermosetting resin. The upper surface side of the cast resin frame 2a of FIG. 2 without the anchors 11 may be covered with the fiber-reinforced resin 15.

A conductor plate may be attached at least to one surface of the cast resin frame 2a. By attaching the conductor plate, the effect of metal disposed near the power transmission pad 2 can be reduced.

It is desirable that magnetic flux generated by the coil in the power transmission pad 2 is transmitted to the vehicle 20 side with least loss. Because of this, a metal material such as wire mesh or a reinforcing bar may not be included in at least either of the base structure 3 and the grout 4. If the metal material is present in a path through which the magnetic flux generated by the coil passes, it obstructs propagation of the magnetic flux to degrade magnetic characteristics. Therefore, by not including the metal material in at least either of the base structure 3 and the grout 4, degradation of the magnetic characteristics can be restricted.

As described above, the present embodiment is provided with the cast resin frame 2a that accommodates the coil and the like of the power transmission pad 2. Since the cast resin frame 2a is embedded in the ground, cracks do not occur which otherwise occur in the case where the coil and the like are solidified with cement or the like, with no possibility of degradation of insulation performance. Moreover, in the present embodiment, the cast resin frame 2a is disposed on the base structure 3 and the grout 4 is filled therebetween, and hence the position of the cast resin frame 2a does not change in the vertical direction to make it easy to expose the power transmission pad 2. Especially, by fixing the cast resin frame 2a and the base structure 3 with the anchors 11, it becomes easy to adjust the position of the cast resin frame 2a in the vertical direction. Moreover, by inserting the cable 8 extending from the power transmission pad 2 into the protective tube 9, disconnection of the cable 8 can be prevented. Furthermore, by covering the upper surface side of the cast resin frame 2a with the fiber-reinforced resin 15, load bearing of the power transmission pad 2 can be improved While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A power transmission apparatus comprising:
    a power transmission pad for wireless power transmission, the power transmission pad comprising a cast resin frame, at least part of the cast resin frame being embedded in ground;
    a base structure disposed below the power transmission pad;
    grout filled around the power transmission pad, including a gap between an upper surface of the base structure and the power transmission pad;
    a soil-invasion restriction member disposed around both of the base structure and the grout to directly contact the grout, the soil-invasion restriction member preventing component materials of the base structure and of the grout from flowing into surrounding gravel; and
    an anchor joined to the cast resin frame and fixed to the base structure, the anchor being disposed in the grout and adjusting a position of the power transmission pad in a depth direction.

2. The power transmission apparatus of claim 1, wherein the base structure comprises concrete.

3. The power transmission apparatus of claim 1, wherein the soil-invasion restriction member comprises asphalt.

4. The power transmission apparatus of claim 1, wherein an upper surface side of the cast resin frame is exposed from the ground.

5. The power transmission apparatus of claim 1 further comprising:
    a cable extending from the power transmission pad; and
    a protective tube to cover the cable.

6. The power transmission apparatus of claim 5 further comprising an insulator to cover around a connected part of the cable with the cast resin frame.

7. The power transmission apparatus of claim 1, wherein the cast resin frame comprises thermosetting resin.

8. The power transmission apparatus of claim 1, wherein the cast resin frame comprises fiber-reinforced resin.

9. The power transmission apparatus of claim 1, wherein an upper surface of the cast resin frame comprises a concavity and a convexity.

10. The power transmission apparatus of claim 1, wherein the grout has an expansion rate of 0% or higher at a normal temperature.

11. The power transmission apparatus of claim 1 further comprising a conductor plate disposed on at least one surface of the cast resin frame, except for an upper surface of the cast resin frame.

12. The power transmission apparatus of claim 1, wherein the base structure and the grout comprise an insulation material without conductive material.

* * * * *